July 27, 1948.  G. W. BLAIR  2,446,075
PREPARATION OF RUBBER CRUMBS
Filed Dec. 2, 1944
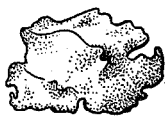
FROZEN LATEX PARTICLE
THAWED PARTICLE
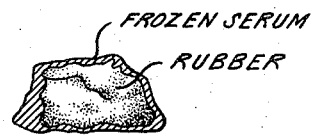
REFROZEN PARTICLE
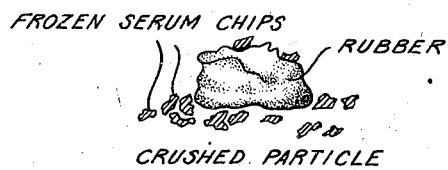
CRUSHED PARTICLE
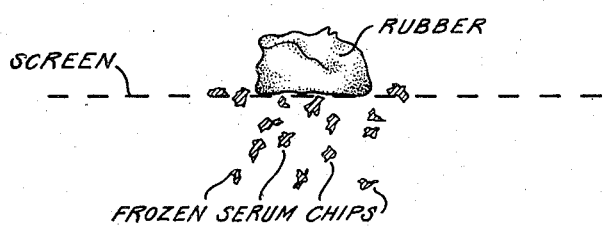
INVENTOR.
GEORGE W. BLAIR
BY Lester J. Budley
ATTORNEY Patented July 27, 1948

2,446,075

UNITED STATES PATENT OFFICE 2,446,075

PREPARATION OF RUBBER CRUMBS

George W. Blair, Mishawaka, Ind., assignor to United States Rubber Company, New York, N. Y., a corporation of New Jersey Application December 2, 1944, Serial No. 566,391

2 Claims. (Cl. 260—96)

The present invention relates to the preparation of rubber crumbs, more particularly to the preparation of rubber crumbs from frozen coagulated latex particles and containing a reduced amount of serum solids.

Frozen coagulated latex particles have been prepared by pouring a fluid latex, which may contain desired compounding ingredients for the rubber, into a continuously agitated liquid medium which is below the freezing point of the latex and maintaining the latex particles in the cooling medium until the particles are frozen and irreversibly coagulated. The particles may then be separated from the cooling bath, thawed, washed if desired, and dried. This is disclosed in copending application of W. J. Clayton and L. C. Kulp, Serial No. 566,390, filed December 2, 1944. Frozen latex particles may also be formed by spraying the latex into a cooling medium at a temperature below the freezing point of the latex.

According to the present invention, rubber crumbs may be recovered from frozen latex particles in a simple manner and in purified condition; that is, containing a reduced amount of residual solids from the serum portion of the original latex, whether such solids are naturally occurring as in a natural latex, are present from the preparation of a synthetic rubber latex, or are added to a latex with compounding ingredients, as protectives, wetting agents, or the like.

The drawing illustrates diagrammatically the various steps in the treatment of the frozen coagulated latex particles according to the present invention.

The latex may be natural rubber latex or a synthetic rubber latex such as the well known aqueous emulsion polymerizates of butadienes-1,3, for example, butadiene-1,3 methyl-2-butadiene-1,3 (isoprene), chloro-2-butadiene (chloroprene), piperylene, 2,3-dimethyl butadiene-1,3 or of mixtures of such butadienes-1,3 with other polymerizable compounds which are capable of forming copolymers with butadienes-1,3, for example, compounds which contain a $CH_2=C<$ group where at least one of the disconnected valences is attached to an electro-active group, that is, a group which substantially increases the electrical dissymmetry or polar character of the molecule, as for example, compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Examples of such commercial present day synthetic latices are neoprene latex or GR–M latex, which is an aqueous dispersion of polymerized chloro-2-butadiene-1,3, Buna S latex or GR–S latex, which is an aqueous dispersion of a copolymer of butadiene-1,3 and styrene, and Buna N latex or GR–N latex which is a copolymer of butadiene-1,3 and acrylonitrile.

The various latices as described above will readily freeze on reduction of the temperature to a temperature below the freezing point of the aqueous phase of the dispersion. The rubber in the latex also irreversibly coagulates on being maintained at the freezing temperature for the requisite amount of time.

In carrying out the present invention, the temperature of the frozen, coagulated latex particles, prepared by any desired means and of any convenient size, preferably around ⅛ to ¼ inch average linear cross dimension, is raised to above the freezing point of the serum portion and allowed to remain at such temperature for a time sufficient for syneresis of the serum to the outside of the coagulum particles to take place. In practice two hours at room temperature has been found sufficient. The latex particles on freezing form homogeneous solid masses, and the rubber becomes irreversibly and uniformly coagulated throughout the frozen particles. As the temperature of the frozen latex particles is raised above the freezing point, the aqueous serum portions melt and at first remain uniformly dispersed through a network of the rubber, the frozen latex being transformed into a wet homogeneous aqueous gel. On allowing these particles of latex gel to stand, syneresis takes place and the serum is automatically squeezed out or exudes from throughout the interior of the particles to the outside surface of the solid rubber coagulum cores or centers that are formed by collapse of the rubber networks. In accordance with the invention, the thus synerized coagulum particles are then refrozen, whereby a brittle shell or coating of frozen aqueous serum is formed on the surface or outside of the rubber cores. These frozen synerized particles are physically different from the original frozen latex particles by virtue of the serum being in the form of frozen serum shells covering the rubber cores, whereas the frozen particles of the original latex are homogeneous masses. The frozen shells of serum on the outside of the rubber cores are now mechanically removed from the rubber cores by crushing the particles, as by passing them through rollers, to break off chips of the frozen serum shells from the rubber cores, after which the chips of frozen serum may be separated from the frozen cores by screening, as through 10 to 40 mesh screens depending on the size of the chips, or by other conventional classifying means. The rubber cores thus freed from the chips of frozen serum may be dried to form rubber crumbs.

Referring to the drawing, the various figures thereof show the course of a latex particle, enlarged for clearness, taken through the steps of the process of the present invention. Figure 1 illustrates an originally frozen latex particle prepared in any desired manner as discussed above. As shown, the particle is a homogeneous mass. On raising the temperature to above the freezing point of the serum portion, the particle at first is transformed into a homogeneous gel condition, the melted serum being uniformly dispersed throughout a net work of rubber. In appearance it is similar to Figure 1. On standing, syneresis takes place and the serum exudes from the interior of the rubber network to the outside of a rubber core that is formed by collapse of the rubber network, as illustrated in Figure 2. The synerized particle of Figure 2 is then frozen as shown in Figure 3 with a shell or covering of frozen serum or ice surrounding the rubber core. The refrozen particle of Figure 3 is then crushed to break the frozen serium shell into chips leaving the rubber core. Such a crushed particle is shown in Figure 4. These broken chips of frozen serum shell may be separated from the rubber core by screening as shown in Figure 5, after which the rubber cores may be dried. In a concentrated natural rubber latex compound containing 100 parts dry weight of rubber, 40 parts dry weight carbon black (added as dispersion), 20 parts dry weight of conventional solid compounding ingredients (added as dispersions) and 100 parts of water, the process of the present invention removed 77.5% of the total serum of the latex compound, leaving only 22.5% of the original serum solids in the final rubber crumbs on drying the rubber cores after separation of the chips of frozen serum therefrom.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of obtaining crumbs of a rubber from frozen coagulated latex particles which comprises raising the temperature of the frozen particles to above the freezing point of the serum portion thereof and allowing the particles to remain at such temperature until syneresis of the serum to the outside of the particles takes place, lowering the temperature of the thus treated particles sufficiently to refreeze the serum on the outside of the cores of coagulum of the synerized particles, mechanically removing at least part of the frozen shells of serum from the outside of the cores of coagulum, and drying the thus treated particles to form crumbs.

2. The method of obtaining crumbs of a rubber from frozen coagulated latex particles which comprises raising the temperature of the frozen particles to above the freezing point of the serum portion thereof and allowing the particles to remain at such temperature until syneresis of the serum to the outside of the particles takes place, lowering the temperature of the thus treated particles sufficiently to refreeze the serum on the outside of the cores of coagulum of the synerized particles, crushing the thus treated particles to break off chips of the frozen serum from said cores of coagulum, separating broken chips of frozen serum from the cores of coagulum, and drying the thus treated particles to form crumbs.

GEORGE W. BLAIR.

REFERENCES CITED

The following references are of record in the file of this patent:

UNITED STATES PATENTS

| Number | Name | Date |
| --- | --- | --- |
| 2,131,333 | Von Schweinitz | Sept. 27, 1938 |